United States Patent
Du

(10) Patent No.: US 10,237,289 B2
(45) Date of Patent: Mar. 19, 2019

(54) METHOD AND DEVICE FOR DETECTING NETWORK INTRUSION

(71) Applicant: Neusoft Corporation, Shenyang, Liaoning (CN)

(72) Inventor: Qiang Du, Liaoning (CN)

(73) Assignee: Neusoft Corporation, Shenyang (CN)

(*) Notice: Subject to any disclaimer, the term of this patent is extended or adjusted under 35 U.S.C. 154(b) by 0 days.

(21) Appl. No.: 15/698,089

(22) Filed: Sep. 7, 2017

(65) Prior Publication Data

US 2018/0115568 A1    Apr. 26, 2018

(30) Foreign Application Priority Data

Oct. 21, 2016  (CN) .......................... 2016 1 0920689

(51) Int. Cl.
| | | |
|---|---|---|
| *H04L 29/06* | (2006.01) | |
| *G06N 3/08* | (2006.01) | |
| *G06N 3/04* | (2006.01) | |

(52) U.S. Cl.
CPC ....... *H04L 63/1416* (2013.01); *G06N 3/0454* (2013.01); *G06N 3/088* (2013.01); *H04L 63/1425* (2013.01); *Y04S 10/54* (2013.01)

(58) Field of Classification Search
CPC ........ G06N 3/0454; G06N 3/084; G06N 3/02; H04L 63/1425
See application file for complete search history.

(56) References Cited

U.S. PATENT DOCUMENTS

| | | | |
|---|---|---|---|
| 9,690,938 B1* | 6/2017 | Saxe ...................... G06F 21/563 |
| 2011/0271146 A1* | 11/2011 | Mork ................ G06F 17/30442 |
| | | | 714/37 |
| 2015/0254555 A1* | 9/2015 | Williams, Jr. ........ G06N 3/0454 |
| | | | 706/14 |
| 2016/0065611 A1* | 3/2016 | Fakeri-Tabrizi .... H04L 63/1425 |
| | | | 726/23 |
| 2016/0127405 A1* | 5/2016 | Kasahara ............ H04L 63/1425 |
| | | | 726/23 |
| 2017/0024649 A1* | 1/2017 | Yan .......................... G06N 5/04 |
| 2017/0169357 A1* | 6/2017 | Caspi ................... G06N 99/005 |
| 2017/0214702 A1* | 7/2017 | Moscovici .......... H04L 63/1416 |
| 2017/0279839 A1* | 9/2017 | Vasseur ................... G06F 17/18 |

(Continued)

OTHER PUBLICATIONS

Niyaz et al, A Deep Learning Approach for Network Intrusion Detection System, Dec. 2015, BICT, 6 Pages (Year: 2015).*

(Continued)

*Primary Examiner* — Christopher C Harris
(74) *Attorney, Agent, or Firm* — Osha Liang LLP

(57) ABSTRACT

The present disclosure provides a method and a device for detecting network intrusion. The method includes: obtaining a feature vector of a network flow to be detected; and detecting the feature vector using a deep neural network, and determining a network intrusion category of the network flow to be detected, in which the deep neural network is generated by training with training data, the training data includes feature vectors of normal samples and feature vectors of attack samples, the attack samples include original attack samples and generated attack samples by adding noise to the original attack samples. The method can improve an ability to identify unknown attacks and a normalization ability of known attacks.

12 Claims, 2 Drawing Sheets

(56) References Cited

U.S. PATENT DOCUMENTS

2018/0013776 A1\* 1/2018 Gay ................... H04L 63/1425
2018/0032871 A1\* 2/2018 Holt ....................... G06N 3/084

OTHER PUBLICATIONS

Holmstrom et al, Using Additive Noise in Back-Propagation Training, Jan. 1992, IEEE, 15 Pages (Year: 1992).\*
Agarwal, Machine Learning: A very quick introduction, Jan. 2013, 6 Pages (Year: 2013).\*
Zamani et al, Machine Learning Techniques for Intrusion Detection, May 9, 2015, 11 pages (Year: 2015).\*
Japkowicz et al, A Novelty Detection Approach to Classification, 1995, 6 Pages (Year: 1995).\*
Office Action issued in corresponding Japanese Application No. 2017-172352 dated Oct. 2, 2018, and English translation thereof (9 pages).
Takashi Nishide et. al,"Feature Extraction and Visualization of Network Attack Using Stacked Denoising Auto-Encoders", SCIS2016 2016, Symposium on Cryptography and Information Security, Institute of Electronics, Information and Communication Engineers, Jan., 2016, p. 1-p. 8 (8 pages).
Akira Yamada et. al, "Machine Learning Based IDS with Automatic Training Data Generation" Journal of the Information Processing Society of Japan, Japan, Information Processing Society of Japan, Aug. 15, 2005, 46th volume, No. 8, p. 1947-p. 1958 (16 pages).

\* cited by examiner

METHOD AND DEVICE FOR DETECTING NETWORK INTRUSION

CROSS-REFERENCE TO RELATED APPLICATIONS

This application is based on and claims priority to Chinese Patent Application No. 201610920689.9, filed on Oct. 21, 2016, the entire contents of which are incorporated herein by reference.

FIELD

The present disclosure relates to a network security technology field, and more particularly to a method and a device for detecting network intrusion.

BACKGROUND

An intrusion detection system (IDS for short) is a network security device or a software application, which can monitor data moving across the network instantly, and can alert or take an active response when find suspicious data.

A kernel function of the IDS is intrusion detection technology. The intrusion detection technology is to find malicious activity or policy violations in the network. At the same time, the intrusion detection technology is widely applied in an intrusion prevention system (IPS for short), a next generation firewall (NGFW for short), or other network security products.

In the related art, the intrusion detection technology mainly includes simple pattern matching, state pattern matching, a signature based on protocol decoding, a heuristic signature, and the like. A common feature of these technologies is to understand attacks in advance and to develop a specific signature for each kind of attack. The intrusion detection technology is to perform signature matching on data flow (or network flow, traffic flow, or packet flow) efficiently. Therefore, there are two obvious defections in the related art. One is lack of an ability to prevent unknown attacks, and the other one is lack of a normalization ability of known attack identification so that it is easy to bypass the detection for hacker by changing attack details and flows of known attacks.

SUMMARY

Embodiments of the present disclosure provide a method for detecting network intrusion including: obtaining a feature vector of a network flow to be detected; and detecting the feature vector using a deep neural network, and determining a network intrusion category of the network flow to be detected according to a detecting result, in which the deep neural network is generated by training with training data, the training data includes feature vectors of normal samples and feature vectors of attack samples, the attack samples include original attack samples and generated attack samples by adding noise to the original attack samples.

Embodiments of the present disclosure provide a network device, including: one or more processors; a memory for storing instructions executable by the one or more processors; in which the one or more processors are configured to: obtain a feature vector of a network flow to be detected; and detect the feature vector using a deep neural network, and determine a network intrusion category of the network flow to be detected according to a detecting result, in which the deep neural network is generated by training with training data, the training data includes feature vectors of normal samples and feature vectors of attack samples, the attack samples include original attack samples and generated attack samples by adding noise to the original attack samples.

Embodiments of the present disclosure provide a non-transitory computer readable storage medium having stored therein instructions that, when executed by a processor of a device, causes the device to perform a method for detecting network intrusion, the method including: obtaining a feature vector of a network flow to be detected; and detecting the feature vector using a deep neural network, and determining a network intrusion category of the network flow to be detected according to a detecting result, in which the deep neural network is generated by training with training data, the training data includes feature vectors of normal samples and feature vectors of attack samples, the attack samples include original attack samples and generated attack samples by adding noise to the original attack samples.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

Above and/or additional aspects and advantages of embodiments of the present disclosure will become apparent and more readily appreciated from the following descriptions made with reference to the drawings, in which.

DETAILED DESCRIPTION

Figure 1:
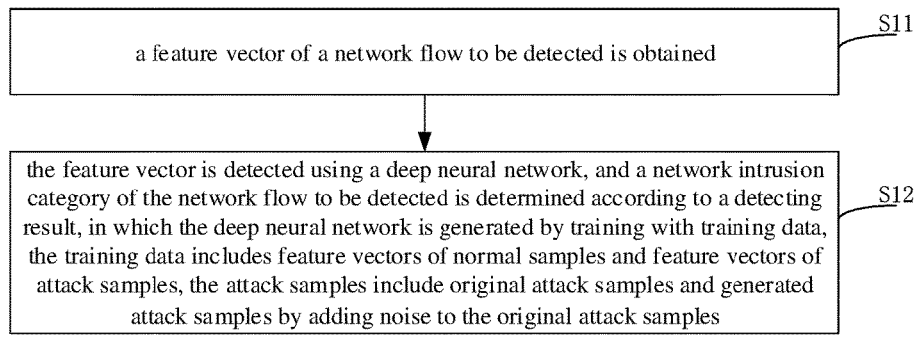
FIG. 1 is a flow chart of a method for detecting network intrusion according to an embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure. Instead, the embodiments of the present disclosure comprise all the variants, modifications and their equivalents within the spirit and scope of the present disclosure as defined by the claims.

FIG. 1 is a flow chart of a method for detecting network intrusion according to an embodiment of the present disclosure.

As illustrated in FIG. 1, the method according to the embodiment of the present disclosure includes followings.

In block S11, a feature vector of a network flow to be detected is obtained.

The network flow to be detected may be data moving across the network.

The feature vector of the network flow to be detected is a vector composed of feature information of the network flow to be detected. The feature information may be set according to requirement. As the network flow to be detected moves across the network continuously, the network flow to be detected can be segmented in a preset unit, and a network flow of each unit is transformed into a feature vector with a preset dimension. The above unit may be set, for example, a session is taken as a unit.

Each feature vector includes a lot of feature information. There may be many alternative modes for selecting the feature information. In this embodiment, it is taken as an example that the feature information includes flow feature information and content feature information.

Therefore, for a network flow of each unit (such as a session), flow feature information f1 and content feature information f2 of the network flow of the unit may be extracted, and a corresponding feature vector f is obtained by combining f1 and f2, that is f={f1, f2}. For example, if f1={0,1}, f2={1,0}, f={0,1,1,0}.

It should be understood that above descriptions of f1 and f2 are explanatory, and specific flow feature information and content feature information can be selected according to requirement or experience. The flow feature information or the content feature information may be single or multiple. For example, the flow feature information may include an average length of messages, a retransfer ratio, a delay mean square error, and the like. The content feature information may include performing multi-mode matching on the decoded content information (which is obtained by identifying an application and by decoding content information (if necessary)) according to a static feature base, and recording hit counts of each static feature into the content feature vector f2, where the static feature base includes a plurality of character strings or regular expression. As there are a lot of feature entries in the static feature base, f2 is a sparse feature vector with a greatly high dimension.

In block S12, the feature vector is detected using a deep neural network, and a network intrusion category of the network flow to be detected is determined according to a detecting result, in which the deep neural network is generated by training with training data, the training data includes feature vectors of normal samples and feature vectors of attack samples, the attack samples include original attack samples and generated attack samples by adding noise to the original attack samples.

Deep learning is a branch of machine learning. The deep learning represents data with high-level abstraction using a plurality of processing layers containing complex structure or using a plurality of processing layers consist of multiple nonlinear transformation structures, so as to express a sufficiently complex mode.

The deep neural network is a neural network base on the deep learning, for example, including a deep belief network (DBN) based on unsupervised-learning, a network containing a plurality of auto-encoder layers, a convolution neural network (CNN) based on supervised-learning, and the like. In this embodiment, it is taken as an example that the deep neural network is the network including a plurality of auto-encoder layers.

When the deep neural network is the network including a plurality of auto-encoder layers, the deep neural network includes an input layer, middle layers and an output layer. The input layer is configured to input a feature vector of a network flow. The middle layers are composed of the plurality of auto-encoder layers and a plurality of secure connection layers. The output layer is configured to output a detecting result. The number of nodes in the output layer is same as the number of network intrusion categories. If there are n network intrusion categories, the number of the nodes in the output layer is n. An output value of each node in the output layer is a probability of a corresponding category. Further, the network intrusion categories may include a non-attack category and an attack category, such that it can be identified whether the network flow to be detected is an attack via the deep neural network. Alternatively, the network intrusion categories include not only the non-attack category and the attack category, but may further include one non-attack category and n−1 attack categories. At this time, it not only can identify whether the network flow to be detected is the attack, but also can identify a specific attack category of the network flow to be detected. The attack categories are settable, such as including a distributed denial of service (DDoS for short) attack, a structured query language (SQL for short) injected attack, and the like.

Before detecting the feature vector using the deep neural network, the deep neural network is trained. When training the deep neural network, training data is used to train the deep neural network. The training data includes the feature vectors of the normal samples and the feature vectors of the attack samples. The normal samples are non-attack samples. The normal samples and the attack samples may be collected according to existing network transmission state.

In an embodiment, the attack samples not only include the original attack samples but also include the generated attack samples by adding the noise to the original attack samples. The original attack samples are original data of collected attack samples, and the generated attack samples are data by adding the noise to the original data.

Because there are a large number of normal messages and attack messages is less in real network transmission, a large number of normal samples can be collected, but only a small number of attack samples can be collected. However, in embodiments of the present disclosure, by performing a noise adding on the original attack samples, an ability to identify unknown attacks can be improved, and a normalization ability of known attacks can be improved.

In an embodiment, by detecting the network intrusion category using the deep neural network, an advantage that the deep neural network has a strong ability to express complex modes can be used, thus complex attacks can be identified. In addition, the training data used in training the deep neural network includes the feature vectors of the generated attack samples added with the noise, thus improving an ability to identify unknown attacks and improving a normalization ability of known attacks.

Figure 2:
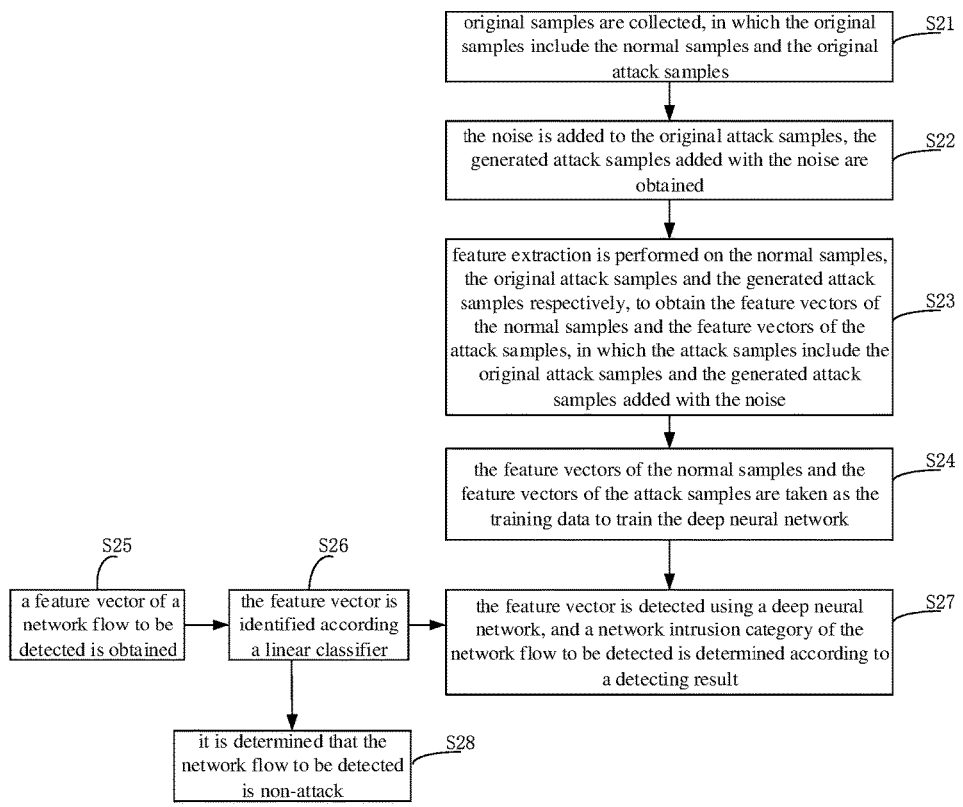
FIG. 2 is a flow chart of a method for detecting network intrusion according to another embodiment of the present disclosure.

FIG. 2 is a flow chart of a method for detecting network intrusion according to another embodiment of the present disclosure.

Above embodiments mainly give flows in a detecting phase, and flows in a training phase is added in this embodiments. A deep neural network is generated in the training phase, so as to perform network intrusion detection on a network flow to be detected in the detecting phase.

In addition, the above embodiments mainly refer to contents of detecting with the deep neural network. However, full flow detection may cause large spending. Therefore, a filtration may be performed before the detection using the deep neural network to filter some flows that does not necessary to detect with the deep neural network, so as to reduce the spending. Therefore, a filtration process is included in the detecting phase in this embodiment.

Referring to FIG. 2, the method according to this embodiment includes followings.

In block S21, original samples are collected, in which the original samples include the normal samples and the original attack samples.

Existing network transmission messages may be collected to obtain a large number of samples, and the normal samples and attack samples can be distinguished according to existing information. In addition, in order to distinguish with the attack samples added the noise below, the attack samples collected in this block can be called the original attack samples.

In block S22, the noise is added to the original attack samples, the generated attack samples added with the noise are obtained.

Considering that the number of normal samples that can be collected is large, therefore, the noise may not be added to the normal samples but only be added to the attack samples. Certainly, it can be understood that, a possibility for adding the noise to the normal samples is not excluded in embodiments of the present disclosure.

Supposing that the original attack samples are represented by d and the generated attack samples added with the noise are represented by N(d).

In one aspect, in adding mode, the noise may be added to the original attack samples according to a predetermined sample base and a predetermined rule base. The sample base includes a great number of samples having labels, that is, the sample base includes the normal samples and the attack samples. As material to add the noise, the rule base may include rules for adding noise. The rules for adding noise are artificially written according to attack variants and escapes which are understood by security experts, so as to select samples from the sample base according to these rules to obtain the generated attack samples added with the noise. For example, these rules include "randomly insert a data segment of a normal sample d2 into an attack sample d1, and do not change attack property". These rules are not guaranteed to be absolutely correct and only need to be correct at a great probability, because the few generated wrong samples can be processed by an anti-noise ability of the neural network.

In another aspect, in quantity, for each d, there may be a plurality of N(d)s. Further, the numbers of samples added with the noise corresponding to different original attack samples may be different. For example, it can be represented by following formula of:

$$l_i = \frac{\gamma}{n \times c_i}$$

where, $l_i$ is the number of samples N(d) added with the noise corresponding to a certain original attack sample d, $\gamma$ is a known large value, n is the total number of network intrusion categories, and $c_i$ is the number of existing attack samples in a category of d.

It can be seen from the above formula, $l_i$ is inversely proportional to $c_i$. Therefore, while increasing the normalization ability of the network, training samples of the network can keep balanced between all categories. The balanced training set can help to control an error of final training results of the network.

In block S23, feature extraction is performed on the normal samples, the original attack samples and the generated attack samples respectively, to obtain the feature vectors of the normal samples and the feature vectors of the attack samples, in which the attack samples include the original attack samples and the generated attack samples added with the noise.

For example, for one sample, flow feature information f1 and content feature information may be extracted, and then a feature vector of the sample is obtained by combining f1 and f2. The specific process of feature extraction may be as above embodiments.

In block S24, the feature vectors of the normal samples and the feature vectors of the attack samples are taken as the training data to train the deep neural network.

A training process of the deep neural network includes two phases, a per-training phase and a fine-tuning phase. In the per-training phase, parameters of each network layer are obtained with supervised learning, so as to finish initialization of the network. In the supervised learning, training begins from a bottom layer, and one layer is trained each time, a result of which is taken as an input of a higher layer. In the fine-tuning phase, a supervised algorithm (such as BP algorithm) from bottom layer to top layer is used to adjust initial parameters of each layer.

For example, if the deep neural network is a network including a plurality of auto-encoder layers, an objective of the training phase is to making an input vector without noise as close as possible to an output of an input vector with noise after going through the deep neural network. That is, if the input vector without noise is represented with x, the input vector with noise is represented with x', and the output of x' after going through the deep neural network is represented with z(x'), the objective of the training phase is to making x as close as possible to z(x').

The above input vector without noise is a feature vector obtained by performing feature extraction on the original attack sample. The input vector with noise is a feature vector obtained by performing feature extraction on the generated attack sample added with the noise.

Therefore, after collecting the original attack samples, the generated attack samples added with the noise can be obtained by adding the noise to the original samples. As illustrated above, taking adding the noise to the attack samples as an example, d and N(d) can be obtained. The feature vector x corresponding to d, and the feature vector x' corresponding to N(d) can be extracted according to the feature extraction mode in above embodiments. And then, each pair of {x, x'} is taken as a single vector, and the deep neural network is trained according the above objective, to obtain parameters of each layer.

For example, parameters of each layer include W, b, b', if H is a vector consist of W, b, b', parameters of each layer can be obtained by updating H using a gradient descent method, expressed by a formula: $H=H-\alpha \times \Delta_H L$. By a certain number of iteration, parameters of each layer can be obtained. $\alpha$ is a known parameter, $\Delta_H L$ represents taking derivative to L, where, $L=\|x-z(x')\|^2$, $z(x')=s(W^T y(x')+b')$, $y(x')=s(Wx'+b)$, s is a non-linear mapping function, such as a sigmoid function.

It can be understood that, what is different from ordinary training process of deed neural network is that the training data in this embodiment further include the feature vector of the sample added with the noise, the objective of the training phase is to making x as close as possible to z(x'), and other steps not described can refer to the ordinary training process, which are not described in detail.

Above S21-S24 can be completed in the training phase, so as to be used in following detecting phase.

In block S25, a feature vector of a network flow to be detected is obtained.

Specific process can refer to the above embodiments, which is not described in detail.

In block S26, the feature vector is identified according a linear classifier, and it is determined whether it is necessary to user the deep neural network to detect the network flow to be detected.

If yes, block S27 is executed, otherwise block S28 is executed.

The linear classifier may be generated by training the training data in the training phase.

An objective of the linear classifier is to quickly classify the network flow, so as to determine whether the network flow is suspicious, and to send the suspicious network flow to the deep neural network to process. Design of the linear classifier is to reduce a missing alarm rate rather than a false alarm rate because the suspicious network flow determined by the linear classifier will be sent to the deep neural network.

The linear classifier can be realized by using logistic regression algorithm, and by collecting a certain number of attack samples and normal flow samples for training. A training process is an adjusting process of external weights of the linear classifier, such that an output value of the linear classifier represents a probability to be an attack. When in operating phase, a feature vector of one network flow is input, and a probability p ($0 \leq p \leq 1$) that the network flow to be an attack is output by the algorithm. When p is larger than a critical constant, it is determined that the network flow is necessary to be detected with the deep neural network, otherwise the network flow is not necessary to be detected with the deep neural network.

In block S27, the feature vector is detected using a deep neural network, and a network intrusion category of the network flow to be detected is determined according to a detecting result.

An input of the deep neural network is the feature vector f of the network flow to be detected, an output of the deep neural network is probabilities of each network intrusion category, expressed by vector $o \in [0,1]^n$, that is, the output is a n dimension vector. A value of each dimension of the n dimension vector is between 0 and 1, and corresponds to one network intrusion category. The network intrusion categories may include one non-attack and n−1 attack categories, where, a network intrusion category to which the network flow to be detected belongs can be determined according to a specific value. For example, if a value of non-attack corresponding to an output vector is 1 or approximate to 1, and other values are 0 or approximate to 0, it is determined that the network flow to be detected is non-attack. Alternatively, if a value of DDoS attack corresponding to the output vector is 1 or approximate to 1, and other values are 0 or approximate to 0, it is determined that the network flow to be detected is a DDoS attack.

In block S28, it is determined that the network flow to be detected is non-attack.

In this embodiment, by detecting the network intrusion category using the deep neural network, an advantage that the deep neural network has a strong ability to express complex modes can be used, thus complex attacks can be identified. Further, the training data used in training the deep neural network includes the feature vectors of the generated attack samples added with the noise, thus improving an ability to identify unknown attacks and improving a normalization ability of known attacks. Furthermore, by using the linear classifier to classify the network flow to be detected before processing with the deep neural network, the number of network flows that are necessary to be detected with the deep neural network is reduced, thus reducing system spending, and enhancing performance of attack identification in real network environment.

Figure 3:
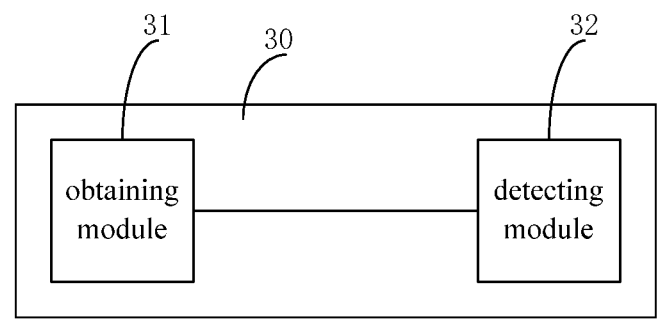
FIG. 3 is a block diagram of a device for detecting network intrusion according to an embodiment of the present disclosure.

FIG. 3 is a block diagram of a device for detecting network intrusion according to an embodiment of the present disclosure.

As illustrated in FIG. 3, the device 30 according to this embodiment includes an obtaining module 31 and a detecting module 32.

The obtaining module 31 is configured to obtain a feature vector of a network flow to be detected.

The detecting module 32 is configured to detect the feature vector using a deep neural network, and to determine a network intrusion category of the network flow to be detected according to a detecting result, in which the deep neural network is generated by training with training data, the training data includes feature vectors of normal samples and feature vectors of attack samples, the attack samples include original attack samples and generated attack samples by adding noise to the original attack samples.

Figure 4:
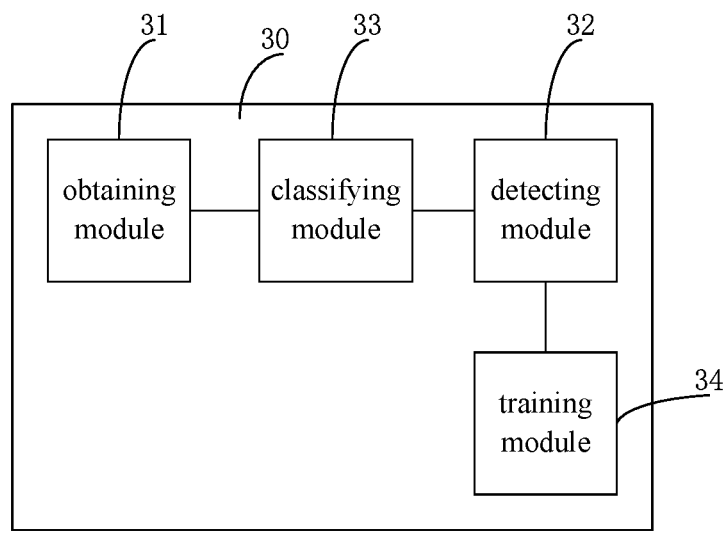
FIG. 4 is a block diagram of a device for detecting network intrusion according to another embodiment of the present disclosure.

In some embodiments, as illustrated in FIG. 4, the device 30 further includes a classifying module 33.

The classifying module 33 is configured to identify the feature vector according to a linear classifier, and to determine whether it is necessary to use the deep neural network to detect the network flow to be detected, so as to trigger execution of the detecting module 32 when it is necessary to use the deep neural network to detect the network flow to be detected.

In some embodiments, as illustrated in FIG. 4, the device 30 further includes a training module 34.

The training module is configured to collect original samples, in which the original samples include the normal samples and the original attack samples, to add the noise to the original attack samples to obtain the generated attack samples, to perform feature extraction on the normal samples, the original attack samples and the generated attack samples respectively to obtain the feature vectors of the normal samples and the feature vectors of the attack samples, in which the attack samples include the original attack samples and the generated attack samples, to take the feature vectors of the normal samples and the feature vectors of the attack samples as the training data to train the deep neural network.

In some embodiments, the training module 34 is configured to add the noise to the original attack samples according to a predetermined sample base and a predetermined rule base, and to obtain the generated attack samples.

In some embodiments, each original attack corresponds to a plurality of generated attack sample.

In some embodiments, the number of the plurality of generated attack samples is inversely proportional to the number of existing attack samples in a category of an original attack sample corresponding to the plurality of generated attack samples.

In some embodiments, the deep neural network comprises a plurality of auto-encoder layers.

It can be understood that, the device according to embodiments of the present disclosure corresponds to the above method embodiments, and specific content of the device embodiments can refer to related descriptions in the method embodiments, which is not described in detail.

In this embodiment, by detecting the network intrusion category using the deep neural network, an advantage that the deep neural network has a strong ability to express complex modes can be used, thus complex attacks can be identified. In addition, the training data used in training the deep neural network includes the feature vectors of the generated attack samples added with the noise, thus improving an ability to identify unknown attacks and improving a normalization ability of known attacks.

Embodiments of the present disclosure also provide a network device, including: one or more processors; a memory; and one or more programs stored in the memory, in which when the one or more programs are executed by the one or more processors, a following method is executed, which includes: obtaining a feature vector of a network flow to be detected; and detecting the feature vector using a deep neural network, and determining a network intrusion category of the network flow to be detected according to a detecting result, in which the deep neural network is generated by training with training data, the training data includes feature vectors of normal samples and feature vectors of attack samples, the attack samples include original attack samples and generated attack samples by adding noise to the original attack samples.

Embodiments of the present disclosure also provide a non-transitory computer readable storage medium for storing one or more modules, in which when the one or more modules are executed, a following method is executed, which includes: obtaining a feature vector of a network flow to be detected; and detecting the feature vector using a deep neural network, and determining a network intrusion category of the network flow to be detected according to a detecting result, in which the deep neural network is generated by training with training data, the training data includes feature vectors of normal samples and feature vectors of attack samples, the attack samples include original attack samples and generated attack samples by adding noise to the original attack samples.

Embodiments of the present disclosure also provide a computer program, in which when the computer program executed, a following method is executed, which includes: obtaining a feature vector of a network flow to be detected; and detecting the feature vector using a deep neural network, and determining a network intrusion category of the network flow to be detected according to a detecting result, in which the deep neural network is generated by training with training data, the training data includes feature vectors of normal samples and feature vectors of attack samples, the attack samples include original attack samples and generated attack samples by adding noise to the original attack samples.

It can be understood that, the same or similar parts in above embodiments can refer to each other, and contents not described in detail in some embodiments can refer to the same or similar parts in other embodiments.

It should be noted that, in the description of the present disclosure, terms such as "first" and "second" are used herein for purposes of description and are not intended to indicate or imply relative importance or significance. In addition, in the description of the present invention, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order illustrated.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

In the description of the present disclosure, reference terms such as "an embodiment," "some embodiments," "an example," "a specific example," or "some examples," means that a particular feature, structure, material, or characteristic described in connection with the embodiment or example is included in at least one embodiment or example of the present disclosure. In the description of the present disclosure, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been illustrated and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for detecting network intrusion, comprising:
obtaining a feature vector of a network flow to be detected; and
detecting the feature vector using a deep neural network, and determining a network intrusion category of the network flow to be detected according to a detecting result, wherein the deep neural network is generated by training with training data, the training data comprises feature vectors of normal samples and feature vectors of attack samples, the attack samples comprise original attack samples and generated attack samples by adding noise to the original attack samples,
wherein the method further comprises:
collecting original samples, wherein the original samples comprise the normal samples and the original attack samples;
adding the noise to the original attack samples to obtain the generated attack samples;
performing feature extraction on the normal samples, the original attack samples and the generated attack samples respectively to obtain the feature vectors of the normal samples and the feature vectors of the attack samples, wherein the attack samples comprise the original attack samples and the generated attack samples;
taking the feature vectors of the normal samples and the feature vectors of the attack samples as the training data to train the deep neural network,
wherein each original attack corresponds to a plurality of generated attack samples,
wherein the number of the plurality of generated attack samples is inversely proportional to the number of existing attack samples in a category of an original attack sample corresponding to the plurality of generated attack samples.

2. The method according to claim 1, after obtaining a feature vector of a network flow to be detected, further comprising:
identifying the feature vector according to a linear classifier, and determining whether to detect the feature vector using the deep neural network according to an identifying result.

3. The method according to claim 1, wherein the adding the noise to the original attack samples to obtain the generated attack samples comprises:
adding the noise to the original attack samples according to a predetermined sample base and a predetermined rule base to obtain the generated attack samples.

4. The method according to claim 1, wherein the deep neural network comprises a plurality of auto-encoder layers.

5. A network device for detecting network intrusion, comprising:
one or more processors; and
a memory for storing instructions executable by the one or more processors,
wherein the one or more processors are configured to:
obtain a feature vector of a network flow to be detected; and
detect the feature vector using a deep neural network, and determine a network intrusion category of the network flow to be detected according to a detecting result, wherein the deep neural network is generated by training with training data, the training data comprises feature vectors of normal samples and feature vectors of attack samples, the attack samples comprise original attack samples and generated attack samples by adding noise to the original attack samples,
wherein the one or more processors are configured to:
collect original samples, wherein the original samples comprise the normal samples and the original attack samples;
add the noise to the original attack samples to obtain the generated attack samples;
perform feature extraction on the normal samples, the original attack samples and the generated attack samples respectively to obtain the feature vectors of the normal samples and the feature vectors of the attack samples, wherein the attack samples comprise the original attack samples and the generated attack samples;
take the feature vectors of the normal samples and the feature vectors of the attack samples as the training data to train the deep neural network,
wherein each original attack corresponds to a plurality of generated attack samples,
wherein the number of the plurality of generated attack samples is inversely proportional to the number of existing attack samples in a category of an original attack sample corresponding to the plurality of generated attack samples.

6. The device according to claim 5, wherein the one or more processors are configured to:
after obtaining a feature vector of a network flow to be detected, identify the feature vector according to a linear classifier, and determine whether to detect the feature vector using the deep neural network according to an identifying result.

7. The device according to claim 5, wherein the one or more processors are configured to add the noise to the original attack samples to obtain the generated attack samples by acts of:
adding the noise to the original attack samples according to a predetermined sample base and a predetermined rule base to obtain the generated attack samples.

8. The device according to claim 5, wherein the deep neural network comprises a plurality of auto-encoder layers.

9. A non-transitory computer-readable storage medium having stored therein instructions that, when executed by a processor of a device, causes the device to perform a method for detecting network intrusion, the method comprising:
obtaining a feature vector of a network flow to be detected; and
detecting the feature vector using a deep neural network, and determining a network intrusion category of the network flow to be detected according to a detecting result, wherein the deep neural network is generated by training with training data, the training data comprises feature vectors of normal samples and feature vectors of attack samples, the attack samples comprise original attack samples and generated attack samples by adding noise to the original attack samples,
wherein the method further comprises:
collecting original samples, wherein the original samples comprise the normal samples and the original attack samples;
adding the noise to the original attack samples to obtain the generated attack samples;
performing feature extraction on the normal samples, the original attack samples and the generated attack samples respectively to obtain the feature vectors of the normal samples and the feature vectors of the attack samples, wherein the attack samples comprise the original attack samples and the generated attack samples;
taking the feature vectors of the normal samples and the feature vectors of the attack samples as the training data to train the deep neural network,
wherein each original attack corresponds to a plurality of generated attack samples,
wherein the number of the plurality of generated attack samples is inversely proportional to the number of existing attack samples in a category of an original attack sample corresponding to the plurality of generated attack samples.

10. The non-transitory computer-readable storage medium according to claim 9, wherein after obtaining a feature vector of a network flow to be detected, the method further comprises:
    identifying the feature vector according to a linear classifier, and determining whether to detect the feature vector using the deep neural network according to an identifying result.

11. The non-transitory computer-readable storage medium according to claim 9, wherein the adding the noise to the original attack samples to obtain the generated attack samples comprises:
    adding the noise to the original attack samples according to a predetermined sample base and a predetermined rule base to obtain the generated attack samples.

12. The non-transitory computer-readable storage medium according to claim 9, wherein the deep neural network comprises a plurality of auto-encoder layers.

* * * * *